April 30, 1957   A. SENKOWSKI ET AL   2,790,522
BRAKE EQUALIZER SYSTEM
Filed April 6, 1954                   2 Sheets-Sheet 1

INVENTORS.
ALEXANDER SENKOWSKI &
ERIC ISAAC WATSON
by Carlson, Pitzner, Hubbard & Wolfe
ATTORNEYS.

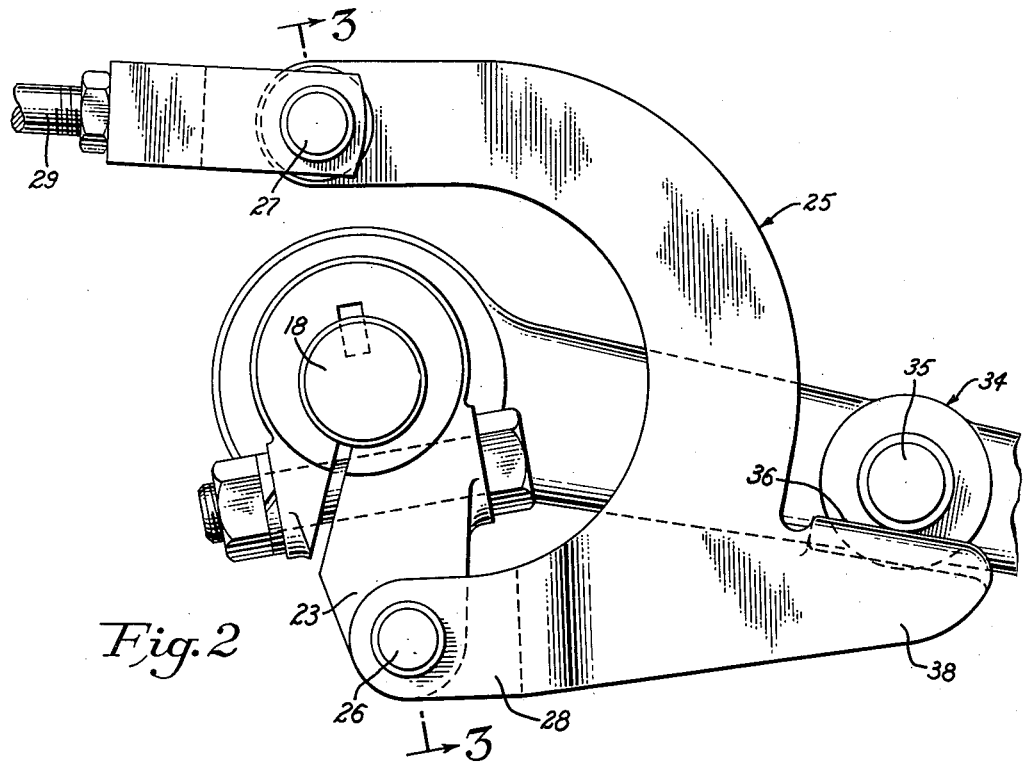
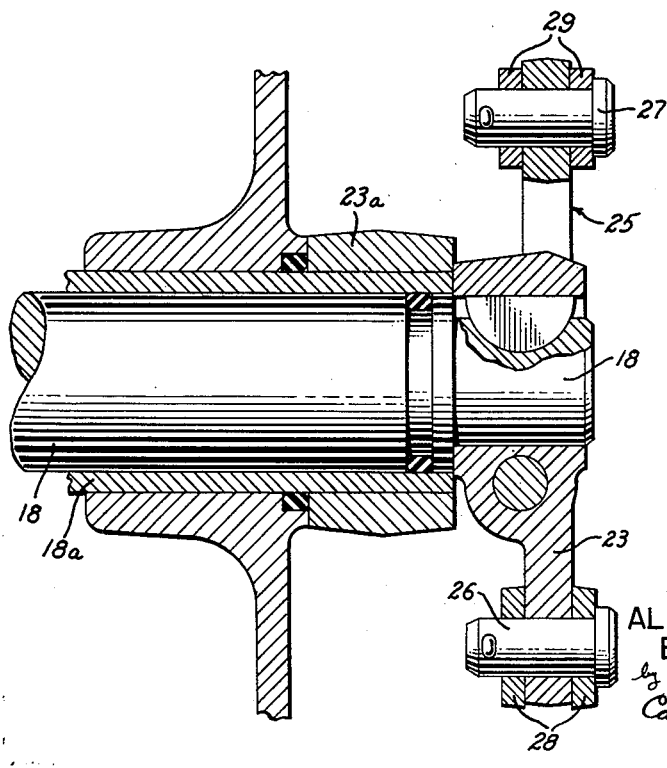

United States Patent Office 2,790,522
Patented Apr. 30, 1957

2,790,522
BRAKE EQUALIZER SYSTEM

Alexander Senkowski, Earlsdon, Coventry, and Eric Isaac Watson, Solihull, England, assignors to Massey-Harris-Ferguson (Sales) Limited, Coventry, England, a British company Application April 6, 1954, Serial No. 421,256

Claims priority, application Great Britain April 17, 1953

5 Claims. (Cl. 188—204)

This invention relates to vehicle braking systems, particularly tractor braking systems of the type having individual rear wheel brakes which may be operated either independently or in unison.

An object of the invention is to operate independent rear wheel brakes on a farm tractor in unison and with substantially equal braking efforts. Moreover, the invention contemplates a braking system in which the rear wheel brakes may be operated individually, as well as in unison.

A further object of the invention is to apply substantially equal torques to a pair of rotatable brake actuators.

Another object is to provide novel means for attaining the foregoing objects.

Further objects and advantages of the invention will appear from the following description, taken with the accompanying drawings, in which:

Fig. 2 is a right side elevational view of an equalizer lever and other associated parts embodied in the braking system of Fig. 1.

Fig. 3 is a sectional view taken along a line 3—3 shown in Fig. 2.

Figure 1:
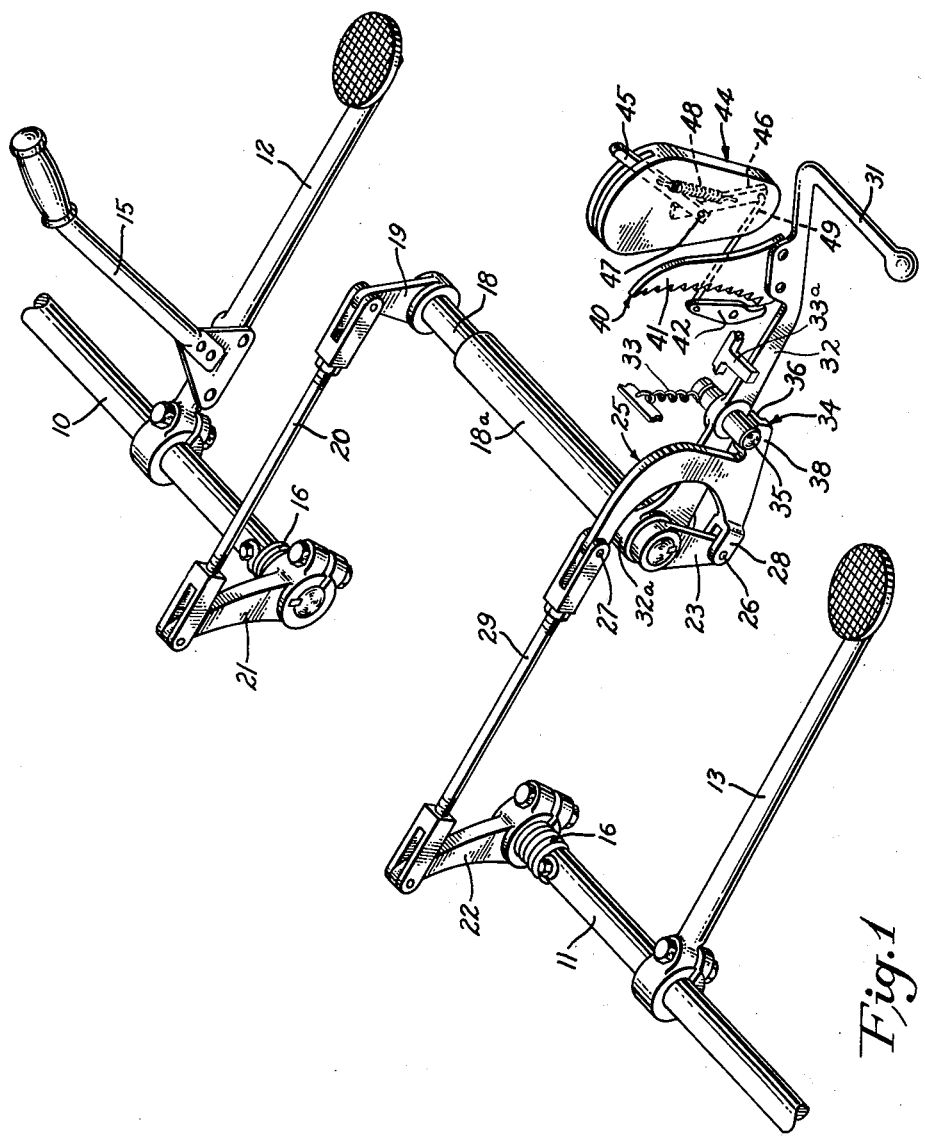
Figure 1 is a somewhat diagrammatic perspective view of an illustrative embodiment of the invention, in the form of an exemplary brake actuating system for a farm tractor, the view being taken from the right front portion of the tractor.

While a particular preferred embodiment of the invention has been shown in the drawings and will now be described in some detail, there is no intention to limit the invention to this embodiment, but rather it is the intention to cover all equivalents, modifications, alternative constructions and usages falling within the spirit and scope of the invention as described in the specification and expressed in the appended claims.

The illustrative braking system, shown in the drawings, is applicable to a farm tractor or any other type of vehicle having individual wheel brakes. To operate the brakes (not shown), the braking system utilizes a pair of conventionally arranged actuating shafts 10, 11 (Fig. 1), which in this instance are axially aligned and spaced apart endwise. The shafts 10, 11 may extend crosswise on the tractor. Mounted on the shafts 10, 11 are respective foot pedals 12, 13 which are depressed by the tractor driver to rock the shafts and thereby apply the individual rear wheel brakes. In the illustrated construction, the left-hand actuating shaft 10 is also equipped with an upwardly extending hand lever 15, bolted or otherwise secured to the corresponding foot pedal 12 so that the tractor driver may operate the left wheel brakes with his left hand, thus leaving his left foot free for operating the tractor's clutch (not shown). It will be evident that a similar hand lever may be mounted on the right-hand pedal if desired. To release the brakes, the braking system is equipped with a pair of torsional return springs 16, coiled around the shafts 10, 11 and arranged to bias the pedals 12, 13 upwardly.

To provide for simultaneous operation of the brakes, the system includes a cross-shaft or rocker 18 extending parallel to the actuating shafts 10, 11 and journaled in a sleeve or bearing 18a. In order that the cross-shaft 18 may rotate in unison with one of the actuating shafts, one end of the cross-shaft 18 has an arm 19 keyed thereto which is pivotally connected to one end of an adjustable link 20. The other end of the link 20 is pivotally connected to an upwardly extending arm 21 keyed or otherwise fixed to the actuating shaft 10. Both arms 19 and 21 extend upwardly, or, in other words, generally at right angles to the horizontal plane of the shafts 10 and 18. A similar upwardly extending arm 22 is keyed to the right-hand actuating shaft 11, while a downwardly extending arm 23 is keyed or otherwise fixed to the cross-shaft 18 at a point opposite the arm 22.

To provide for equalized application of braking effort to the arms 22 and 23, the system employs an equalizer or compensator member in the form of a floating lever 25 (Figs. 1 and 2) which is illustrated as being curved or crescent-shaped so as to extend around the cross-shaft 18 in spaced relation to the shaft. Pivots 26 and 27 are inserted through the lever 25 at points which are on opposite sides of the shaft 18 but are equidistant from the axis of the shaft. More specifically, the pivot 26 extends through a clevis 28 on the equalizer lever 25 and is connected to the downwardly extending arm 23 on the cross-shaft 18. The pivot 27 is connected to the arm 22 by means of an adjustable link 29.

A braking torque may be applied to the equalizer lever 25 by means of a foot pedal 31 (Fig. 1) having an arm 32 equipped with a hub 32a journaled on the bearing 18a (Fig. 3) for rocking movement about the axis of the cross-shaft 18. For urging the arm and pedal upwardly against an upper stop projection 33a, a tension spring 33 may be connected between the midportion of the arm 32 and some point above on the tractor. The pedal 31 is connected to the equalizer lever 25 by a lost motion connection designated generally as 34 (Fig. 2), and formed by a crankpin 35 which is mounted on the pedal arm 32 for engagement with a surface 36 on an abutment arm 38 projecting generally horizontally from the equalizer lever 25. It will be seen that the abutment surface 36 extends generally at right angles to the direction of the arm 23 and in a generally radial relation to the cross-shaft 18. Likewise, the pin is movable in a direction which is generally parallel to a line connecting the pivots 26 and 27. Thus, downward rocking movement of the pedal 31 will apply an actuating force to the equalizer lever 25 in a direction which is generally perpendicular to the directions of the resisting forces applied to the pivots 26 and 27.

The foot pedal 31 may be held in a depressed position by means of a latching mechanism 40 (Fig. 1) which may be of the type disclosed and claimed in the co-pending application of the present inventors, Serial No. 386,002 filed October 14, 1953. Reference may be had to this co-pending application for a detailed description, but for the present purpose it will suffice to note that the latching mechanism comprises a ratchet-toothed plate 41 mounted on the pedal arm 32 and adapted to be engaged by a pivotally mounted ratchet pawl 42. The pawl 42 may be moved either toward or away from the ratchet plate 41 by means of a tumbler mechanism 44 including upwardly and downwardly extending tumbler levers 45 and 46 mounted on a common pivot 47 and interconnected by means of a coiled tension spring 48. A link 49 is connected between the lower end of the tumbler lever 46 and the upper end of the pawl 42. The upper tumbler lever 45 may be grasped manually and swung rearwardly from the position shown in Fig. 1, whereupon the spring 48 will be carried over the center of the pivot 47, and the lower lever 46 accordingly will be snapped rearwardly so as to swing the pawl 42 into engagement with the ratchet plate 41. In a like manner, subsequent forward movement of the upper tumbler lever 45 will snap the lower lever 46 forwardly and thus disengage the pawl 42 from the ratchet plate 41.

While the operation of the illustrative embodiment will be clear from the foregoing description, it may nevertheless be useful to make a brief summary. The two rear wheel brakes of the tractor may be applied simultaneously by depressing the foot pedal 31 against the bias of tension spring 33. This will apply a downward force and a clockwise torque to the equalizer lever 25. The torque will be divided in substantially equal parts between the arms 22 and 23, the torque being applied to the arm 22 by means of the link 29. The downward force on the equalizer lever will be taken up by an upward reaction force exerted by the arm 23. This reactive force will be exerted along a line extending generally radially relative to the cross-shaft 18 and hence will not contribute substantially to the brake actuating torque applied to the cross-shaft. By means of the arms 19 and 21 and the link 20, the torque applied to the cross-shaft will be transmitted to the left-hand actuating shaft 10. Since the lever 25 is floating, it will be free to swing about the pivots 26 and 27 so as to compensate for differences in the ranges of movement of the actuating shafts 10 and 11. Such swinging movement of the lever 25 will result in sliding movement between the pin 35 and the abutment surface 36. One advantage of the lost motion connection 34 is that it will accommodate such sliding action. Since the pivots 26 and 27 are generally equidistant from the axis of the cross-shaft 18, the forces applied to the brake actuating arms 22 and 23 will be substantially equal. In this connection, it may be observed that the lost motion connection 34, and particularly the pivot 35, will act as a floating pivot or fulcrum about which the equalizer lever 25 may rock to insure the application of equal torque to the arms 22 and 23.

The pedal 31 may be latched in a depressed position by swinging the tumbler lever 45 rearwardly so as to engage the pawl 42 with the ratchet plate 41. The latching mechanism 40 may be released by swinging the tumbler lever 45 forwardly, whereupon the pawl 42 will be disengaged from the ratchet plate 41.

The rear wheel brakes may be applied individually by depressing either of the pedals 12 or 13. When one of the pedals 12 or 13 is thus operated, the equalizer lever 25 will swing about the pivots 26 and 27 so that the other pedal will not be affected. The lost motion connection 34 between the pedal 31 and the lever 25 will readily accommodate such idle swinging movement of the equalizer lever 25. It makes no difference whether the latching mechanism 40 is engaged or disengaged during individual actuation of the pedals 12 or 13. As the abutment arm 38 moves downwardly, the tension spring 33 holds the pedal 31 and arm 32 against the stop 33a, and prevents dropping of the pedal and consequent locking of the same in lowered position should the latching mechanism be engaged.

It will thus be evident that the brakes may be applied either individually or in simultaneous, equalized fashion. Applying a single rear wheel brake has the advantage of materially reducing the turning radius of the tractor, thereby enhancing its maneuverability in close quarters. Neither mode of operation interferes with the others, and both may be employed to equal advantage. At the same time, the braking system is rugged, inexpensive and foolproof.

We claim as our invention:

1. An actuating mechanism for a brake system having a pair of brakes, comprising, in combination, a pair of brake actuator shafts having connections with the respective brakes for operating the same, each of said shafts having an actuator arm thereon, a third shaft substantially parallel to said actuator shafts, an arm fixed on said third shaft, link means connected between said last mentioned arm and one of said actuator arms, an additional arm fixed on said third shaft and extending in a radial direction therefrom, an equalizer member pivoted to said additional arm and extending around said third shaft to a pivot point substantially opposite the first-mentioned pivot, link means connected between said pivot point on said equalizer member and the other of said actuator arms, an abutment surface on said equalizer member extending generally radially relative to said third shaft and transversely relative to the direction of said additional arm, and an actuating arm pivoted about an axis coinciding with the axis of said third shaft and having an element slidably engageable with said abutment surface for applying a couple thereto effective to rock said actuator shafts in a brake applying direction.

2. A brake actuating mechanism for a tractor having a pair of individual wheel brakes, comprising, in combination, a pair of axially aligned actuating shafts for operating the respective brakes and effective when rocked in one direction to engage the brakes, individual pedals on said shafts for rocking said shafts individually, a cross-shaft parallel to said actuating shafts, a first arm on one of said actuating shafts, a second arm on said cross-shaft, link means connected between said first and second arms for moving said one actuating shaft in unison with said cross-shaft, third and fourth arms on said cross-shaft and the other of said actuating shafts, respectively, extending in opposite directions from and generally perpendicular to a plane extending through said actuating and cross-shafts, a floating equalizer lever having a first pivot connected to said third arm on said cross-shaft and extending around said cross-shaft in spaced relation thereto and having a second pivot disposed on the opposite side of said shaft from said first pivot, link means connected between said second pivot and said fourth arm, an additional pedal swingable about an axis coinciding with the axis of said cross-shaft, an abutment arm on said equalizer lever extending generally in radial relation to said cross-shaft and in transverse relation to a line connected between said first and second pivots, and means on said additional pedal forming a lost motion connection between said additional pedal and said abutment arm for applying a couple to said equalizer lever to rock said actuating shafts in a brake applying direction.

3. An equalizing mechanism for a brake system having two brakes, comprising, in combination, pivoted actuating members operatively connected with the respective brakes and swingable independently to engage the brakes individually, means for actuating either of said members independently of the other, a rocker spaced from said members and having a pair of swingable arms extending generally in opposite directions therefrom, one of said arms being pivotally connected with one of said members, a crescent-shaped equalizer element pivotally connected with the other one of said arms, and means for applying a torque to said element at a point spaced from said rocker for actuating said members with equal force, said last mentioned means including a lost motion connection affording idle movement of said element when said members are individually actuated.

4. An equalizing mechanism for a brake system having two brakes, comprising, in combination, pivoted actuating members operatively connected with the respective brakes and swingable independently to engage the brakes individually, means for actuating either of said members independently of the other, a rocker spaced from said members and carrying a pair of swingable arms, one of said arms being pivotally connected with one of said members, a floating equalizer element pivotally connected with the other one of said arms and extending around said rocker for pivotal connection with the other one of said members, and means for applying a torque to said element at a point spaced from said rocker for actuating said members with equal force, said last mentioned means including a lost motion connection affording idle movement of said element when said members are individually actuated.

5. An equalizing mechanism for a brake system having two brakes, comprising, in combination, pivoted actuating members operatively connected with the respective brakes and swingable independently to engage the brakes individually, means for actuating either of said members independently of the other, a rocker spaced from said members and having a pair of swingable arms extending generally in opposite directions therefrom, one of said arms being pivotally connected with one of said members, a crescent-shaped equalizer element pivotally connected with the other one of said arms and extending around said rocker for pivotal connection with the other one of said members, said equalizer element having an abutment lug extending generally at right angles to the direction of said arms, a swingable arm having a finger movable into abutting engagement with said lug for applying torque to said element for actuating said members with equal force, said finger and said lug forming a lost motion connection affording idle movement of said element when said members are individually actuated.

References Cited in the file of this patent
UNITED STATES PATENTS

| | | |
|---|---|---|
| 2,626,022 | Arnio | Jan. 20, 1953 |
| 2,652,905 | Arnio | Sept. 22, 1953 |